H. J. DAVIS.
COTTON CLEANER.
APPLICATION FILED JULY 22, 1912.
1,054,183.   Patented Feb. 25, 1913.
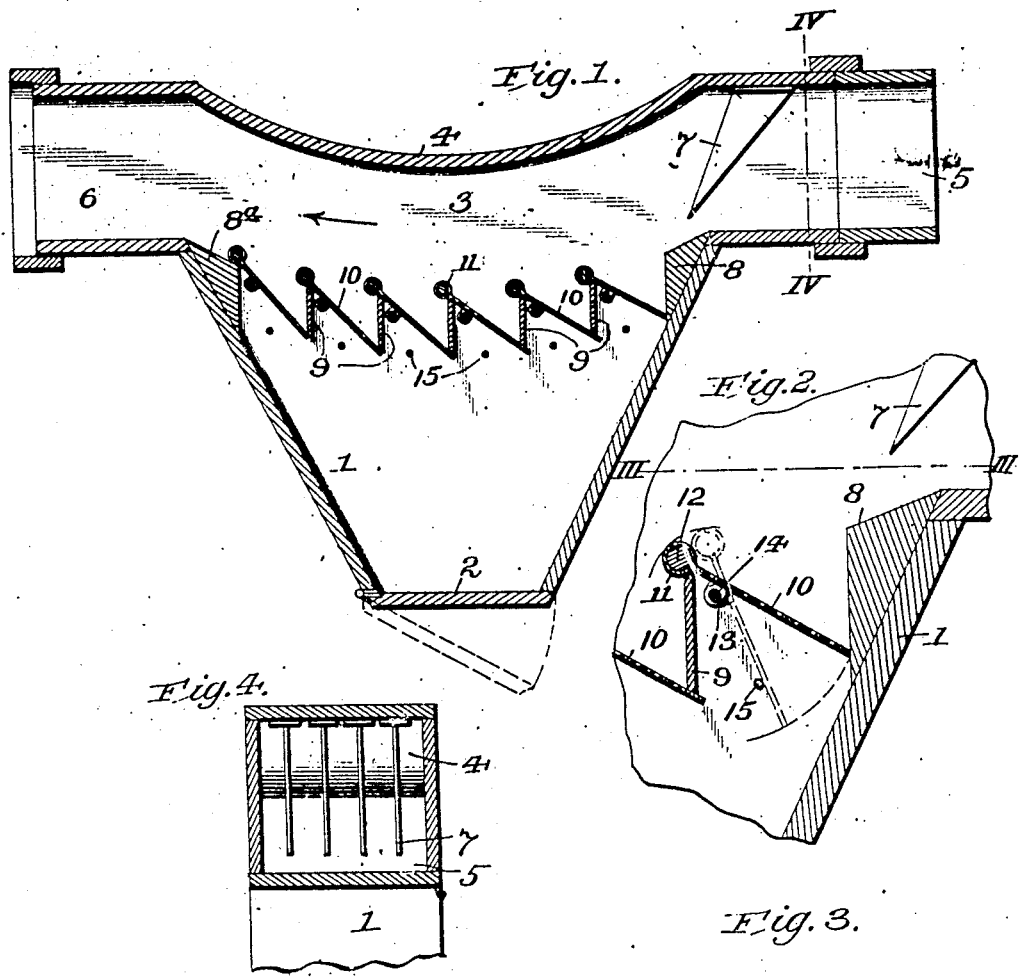
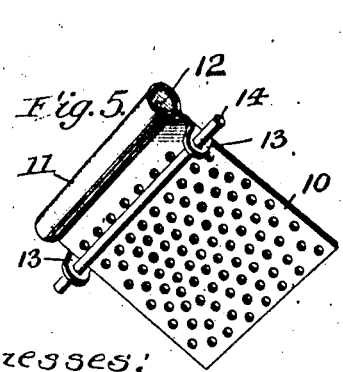
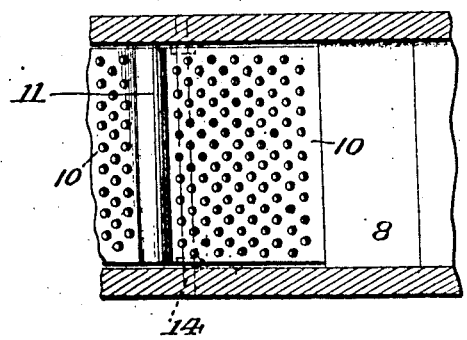
Witnesses:
Inventor:
Henry Jackson Davis,
By Dodge and Sons,
Attorneys.

UNITED STATES PATENT OFFICE.

HENRY JACKSON DAVIS, OF BIRMINGHAM, ALABAMA.

COTTON-CLEANER.

1,054,183.      Specification of Letters Patent.    Patented Feb. 25, 1913.

Application filed July 22, 1912. Serial No. 710,838.

*To all whom it may concern:*

Be it known that I, HENRY JACKSON DAVIS, a citizen of the United States, residing at Birmingham, in the county of Jefferson and State of Alabama, have invented certain new and useful Improvements in Cotton-Cleaners, of which the following is a specification.

My present invention pertains to cotton-cleaners, and has to deal more particularly with a cleaner adapted to remove foreign matter from cotton as it passes through a pneumatic conveyer on its way to the gin.

The invention is illustrated in the annexed drawings, wherein:

Figure 1 is a longitudinal sectional view of the cleaner; Fig. 2 a portion thereof on an enlarged scale; Fig. 3 a horizontal section on the line III—III of Fig. 2; Fig. 4 a transverse sectional view on the line IV—IV of Fig. 1, showing the knives or fixed breakers; and Fig. 5 a perspective view of the underside of one of the gravitating screens.

The main object of the present invention is to provide a cleaner in which the foreign material will be loosened from the cotton, separated therefrom, and finally discharged, the action of the device being automatic.

In the drawings, 1 denotes the hopper-shaped receptacle, having a door 2 hinged to the lower end thereof, and adapted to be kept closed by the suction of the apparatus. The hopper opens at its upper end into a channel or way 3, the upper wall 4 of which is curved downwardly toward the mouth of the hopper.

The inlet for the cotton is designated by 5, and the outlet by 6, it being understood that the device may be inserted in the conveyer at any desired point.

Extending downwardly into the throat of the cleaner is a series of knives 7, the forward edges of the knives being inclined rearwardly and the knives terminating short of the floor of the throat, or a filler-block 8 located below the knives.

Extending across the hopper between its side walls, and adjacent the upper end thereof is a series of cross-bars or plates 9, the bars being evenly spaced and preferably standing in a vertical position. These bars form a series of transversely-extending passages leading from the way or channel 3 into the hopper, and each of said passages is guarded by a gravitating screen-door or closure, 10. Said door is preferably made of sheet metal and provided with a series of perforations, the upper end of the door being formed into a barrel or tubular member 11, adapted to receive lead or any other suitable material, as indicated at 12, such material serving as a weight. Each door is also provided with a pair of ears 13, arranged near the upper end thereof, said ears being adapted to receive a pintle or axle 14, which finds its bearing in the side walls of the structure. The pintle is so arranged with reference to the length of the door, and the weight 12 is so proportioned, that the doors will be held in their closed position, as shown in Fig. 1 and in full lines in Fig. 2. Normally, the barrel-shaped portion 11 overlies the upper end of the adjacent cross-bar 9 or the filler block 8ª at the left in Fig. 1. The lower end of each door passes beneath the lower end of the opposite cross-bar 9, with the exception of that door which is adjacent the filler-block 8, the lower end of said door contacting with said filler-block, as shown in Figs. 1 and 2. Stop pins 15 serve to limit the swinging movement of the lower end of the doors when the weight of the accumulated material thereon overcomes the weight 12 and causes the door to swing downwardly into the position shown in Fig. 2.

When in action the parts will occupy the positions shown in full lines in Fig. 1; that is to say, owing to the suction the door 2 will be held closed and the cotton drawn inwardly in the direction of the arrow across the knives 7 and opened up thereby to a greater or less extent, to permit any foreign material to pass therefrom. The cotton in passing through the way or channel 3 will come in contact with the barrel-shaped members 11 and will be beaten out thereby, so that any foreign matter which was not dislodged by the knives 7 will ultimately be removed from the cotton and deposited upon the screen-doors. When the accumulated material upon any door overcomes the balance of the door, said door will open and discharge the material into the hopper 1, in which it will accumulate until such time as the weight of the material acting on the door 2 overcomes the suction and allows the door to open and discharge the material. The discharge will also take place when the suction is stopped.

The cross-bars 9 and the pivoted doors may be said to form a series of pockets, the doors forming the lower portions of said pockets.

Having thus described my invention, what I claim is:

1. In a cotton-cleaner, the combination of a hopper having a way or channel extending over the upper end thereof; means located in said way for opening up the cotton passing therethrough; and a series of gravitating doors located in the mouth of the hopper and adapted to receive the material dislodged from the cotton and to automatically discharge the same from time to time into the hopper.

2. In a cotton-cleaner, the combination of a hopper having a way or channel extending over the upper end thereof for the passage of the cotton to be cleaned; and a series of gravitating doors located in the mouth of the hopper, said doors being perforate and adapted to automatically discharge material into the hopper.

3. In a cotton-cleaner, the combination of a hopper; a way or channel extending over the mouth of the same and through which the cotton is adapted to be drawn: a series of cross-bars extending from side to side of the hopper at the mouth thereof; and a series of inclined screen-doors pivotally mounted adjacent to the upper end of each of said cross-bars, said doors being normally closed and adapted to open under the weight of material deposited thereon.

4. In a cotton-cleaner, the combination of a hopper; a way or channel extending over the upper end thereof and through which the cotton is to be passed; a series of cross-bars extending from side to side of the hopper adjacent to the mouth thereof and forming a series of channels leading into the hopper; and a pivoted screen-door guarding each of said channels, said door being weighted at its upper end and adapted to be held by said weight in its closed position and to be opened from time to time by the deposit of material thereon, and to discharge the same into the hopper.

5. In a cotton-cleaner, the combination of a hopper; a way or channel located above the upper end thereof through which the cotton is adapted to be drawn; a series of cross-bars extending from side to side of said hopper into the upper end thereof and forming a series of channels leading into the hopper; and a screen-door adapted to normally close each of said channels, the doors being pivoted adjacent their upper end and each having a weight located at its upper end adapted to hold the door in its closed position.

6. In a cotton-cleaner, the combination of a hopper; a way or channel extending over the same through which the cotton is adapted to be drawn: a series of cross-bars located in the mouth of the hopper and forming a series of ways or channels communicating with the channel aforesaid; a screen-door for each of said channels, said door being pivoted adjacent its upper end and provided with a barrel at said upper end adapted to overlie the adjacent cross-bar; a weight mounted in said barrel; and means for limiting the downward swinging movement of the door when opened by the action of the material deposited thereon.

7. In a cotton-cleaner, the combination of a way or channel through which the cotton is drawn; and a series of gravitating doors provided with projections at their upper ends with which the cotton comes in contact and is thereby beaten out.

8. In a cotton-cleaner, the combination of a way or channel through which the cotton is drawn; and a series of pivoted, gravitating doors located in the lower portion of said way or channel, said doors standing in an inclined position and provided with barrel-shaped members at their upper ends with which the cotton in passing through the way or channel comes in contact and is thereby beaten out.

In testimony whereof I have signed my name to this specification in the presence of two subscribing witnesses.

HENRY JACKSON DAVIS.

Witnesses:
J. H. ABERCROMBIE,
A. H. BELL.

Copies of this patent may be obtained for five cents each, by addressing the "Commissioner of Patents, Washington, D. C."